United States Patent
Panchal

(10) Patent No.: US 11,528,635 B2
(45) Date of Patent: Dec. 13, 2022

(54) METHOD AND SYSTEM FOR RADIO RESOURCE MANAGEMENT AND NETWORK SLICING

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 172 days.

(21) Appl. No.: 17/146,643

(22) Filed: Jan. 12, 2021

(65) Prior Publication Data
US 2022/0225153 A1   Jul. 14, 2022

(51) Int. Cl.
*H04W 28/02* (2009.01)
*H04W 28/24* (2009.01)
*H04W 28/10* (2009.01)

(52) U.S. Cl.
CPC ....... *H04W 28/0268* (2013.01); *H04W 28/10* (2013.01); *H04W 28/24* (2013.01)

(58) Field of Classification Search
CPC . H04W 28/24; H04W 28/0268; H04W 28/10; H04W 72/1242
See application file for complete search history.

(56) References Cited

U.S. PATENT DOCUMENTS

| | | | |
|---|---|---|---|
| 2022/0078857 A1* | 3/2022 | Kim | H04W 76/10 |
| 2022/0124732 A1* | 4/2022 | Park | H04W 72/044 |

FOREIGN PATENT DOCUMENTS

| | | | | |
|---|---|---|---|---|
| CN | 113825244 A | * | 12/2021 | |
| EP | 3557892 A1 | * | 10/2019 | ............ G06F 9/5011 |
| WO | WO-2020073838 A1 | * | 4/2020 | ............ H04W 12/06 |
| WO | WO-2020191864 A1 | * | 10/2020 | ............ H04L 41/147 |
| WO | WO-2021020834 A1 | * | 2/2021 | |
| WO | WO-2021136578 A1 | * | 7/2021 | |
| WO | WO-2022022014 A1 | * | 2/2022 | |

* cited by examiner

*Primary Examiner* — Mehmood B. Khan

(57) ABSTRACT

A method, a device, and a non-transitory storage medium are described in which an radio resource management and slice control service is provided. The service may calculate and assign priority weights for processing and transmission of packets received via a network slice and quality of service flow. The service may also calculate and assign a service category set of parameters and values for the packets. The service may calculate the priority weights and the service category set of parameters and values based on a network slice identifier and a quality of service flow identifier. The service may priority weights and service category set of parameters and values may be compatible with stand-alone and non-stand-alone configurations. The service may also provide transport priority to the packets and slice-aware migration, as described herein.

20 Claims, 12 Drawing Sheets

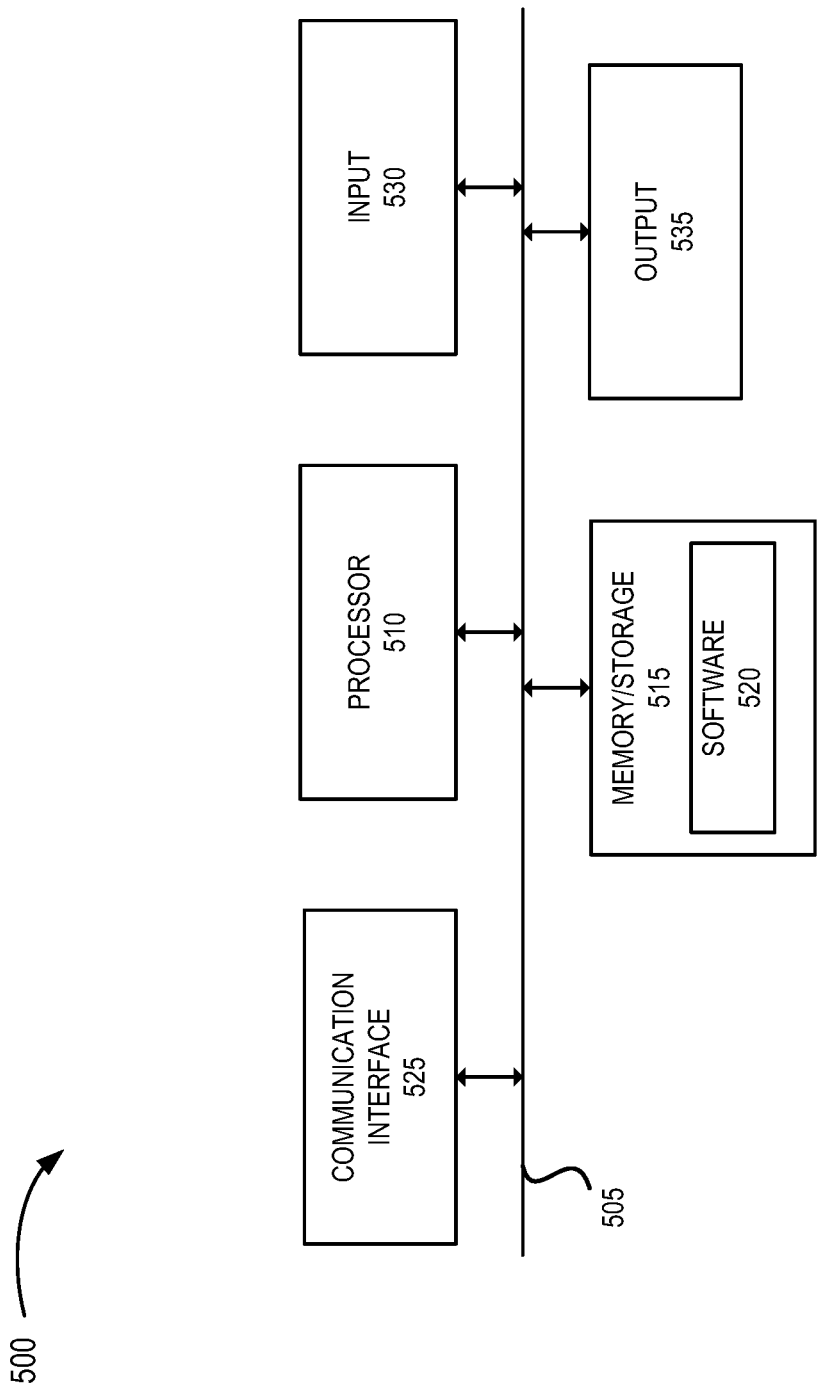

METHOD AND SYSTEM FOR RADIO RESOURCE MANAGEMENT AND NETWORK SLICING

BACKGROUND

Development and design of networks present certain challenges from a network-side perspective and an end device perspective. For example, Centralized Radio Access Network (C-RAN), Open Radio Access Network (O-RAN), and split RAN architectures have been proposed to satisfy the increasing complexity, densification, and demands of end device application services of a future generation network.

BRIEF DESCRIPTION OF THE DRAWINGS

FIG. 5 is a diagram illustrating exemplary components of a device that may correspond to one or more of the devices illustrated and described herein;

DETAILED DESCRIPTION

Figure 1:
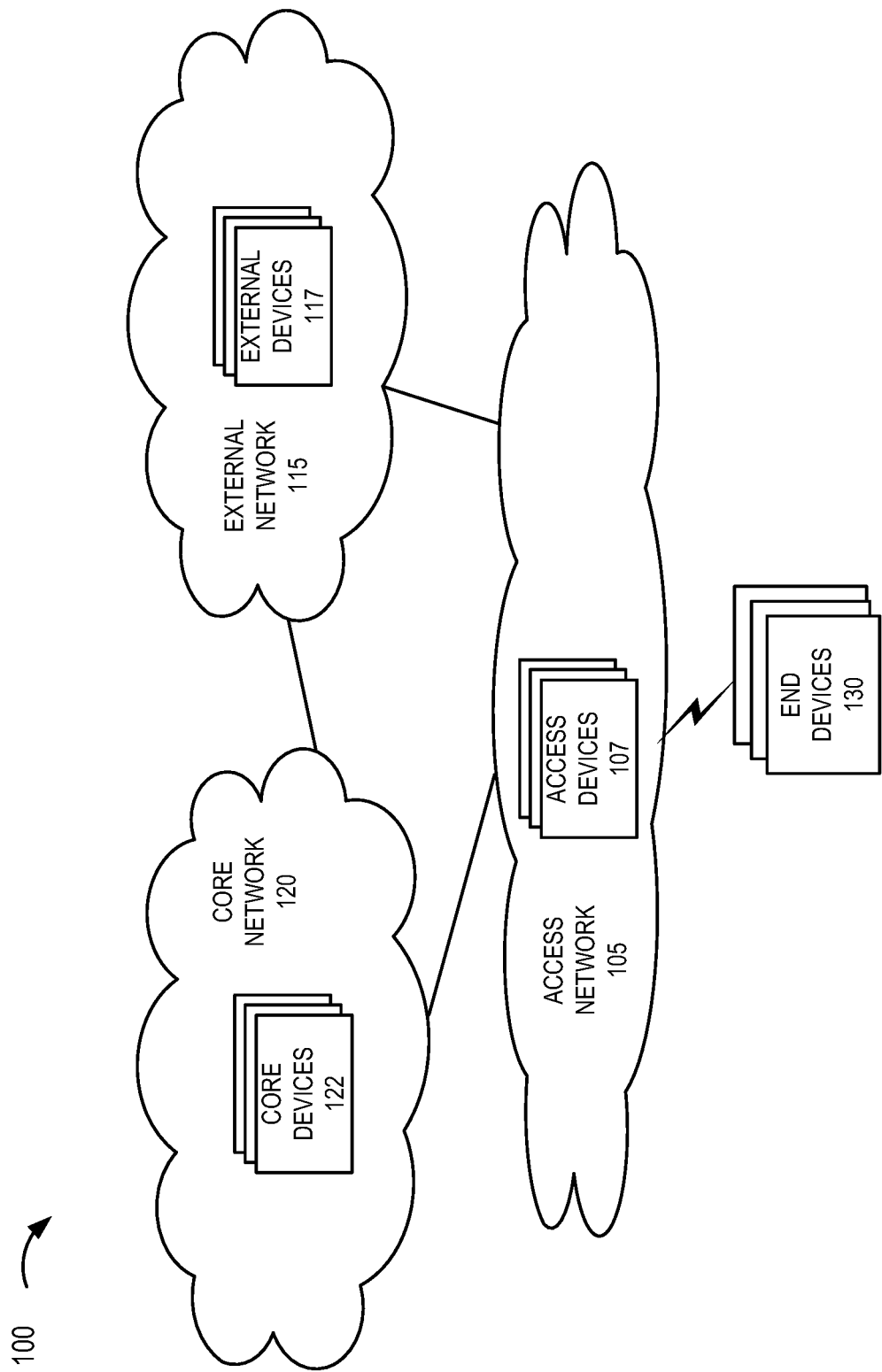
FIG. 1 is a diagram illustrating an exemplary environment in which an exemplary embodiment of a radio resource management and slice control service may be implemented.

The following detailed description refers to the accompanying drawings. The same reference numbers in different drawings may identify the same or similar elements. Also, the following detailed description does not limit the invention.

The performance of a network slice may be reliant on multiple networks, such as a RAN, a core network, and perhaps an application service layer network, as well as various criteria and factors, such as rendering the network slice, carrier aggregation of a device, radio quality, cell-level congestion, latency associated with the core network, Transmission Control Protocol (TCP) flow control, aggregation point for the traffic being sourced for the network slice, reaction to dynamism in the RAN and/or the core network, among other things.

The RAN may or may not be implemented to include various types of split architectures (e.g., functional split, communication plane split, protocol/layer split, etc.). According to such implementations, a RAN device may include the functionality of a distributed unit (DU). The DU may operate in lower layers, such as physical, medium access control (MAC), and radio link control (RLC) layers and may provide scheduling, rate adaptation, channel coding, and modulation, for example. According to a split architecture in which the radio signal processing stack may be decomposed and isolated functions may be implemented, the DU may interface with a centralized unit (CU) or a remote unit (RU) via a transport domain, such as an x-haul network (e.g., front-haul, mid-haul, etc.), for example. Additionally, or alternatively, the DU and the CU may be combined or the RU and the DU may be combined, for example.

The DU or the functional aspects of the DU is/are an important aspect to support network slicing in a RAN. While standards for some aspects of network slicing may be promulgated by various entities (e.g., Third Generation Partnership Project (3GPP), International Telecommunication Union (ITU), European Telecommunications Standards Institute (ETSI), etc.), the functional aspects of the DU that support network slicing are undefined. For example, radio resource management and slice control services of the DU, which may support a network slice and associated quality of servicer (QoS) parameters, may not be configurable by a network operator or another entity of relevance, but may simply be vendor-specific and black box configured. This can negatively impact the ability to adequately control and support the provisioning of a network slice, as well as satisfy a service level agreement (SLA), a user experience, and performance metric parameters and values.

According to exemplary embodiments, a radio resource management and slice control service is described. According to an exemplary embodiment, the radio resource management and slice control service may be implemented in a RAN device. For example, the RAN device may be a DU device. The DU device may be implemented as a standalone or integrated with one or multiple other RAN network elements, as described herein. For example, the RAN device may be implemented as a next generation Node B (gNB) or other type of access device, as described herein.

According to an exemplary embodiment, the radio resource management and slice control service may provide a weighted scheduling service. For example, the weighted scheduling service may calculate and assign a weighted value that indicates a priority for scheduling of transmission of a packet associated with a network slice, a QoS flow, and/or a data radio bearer (DRB). The weighted scheduling service may include multiple weighted values that indicate different scheduling priorities and/or other pre-transmission operations, as described herein.

According to an exemplary embodiment, the radio resource management and slice control service may provide a weighted resource service. For example, the weighted resource service may calculate and assign a weighted value that indicates a priority to resources. According to various exemplary embodiments, the resources may relate to air interface resources (e.g., physical resource blocks (PRBs), a new radio (NR) resource block (RB), etc.) and/or network resources (e.g., processor, memory, storage, communication interface, etc.). The weighted resource service may include multiple weighted values that indicate different resource priorities. Additionally, for example, a weighted value may indicate a reserved or dedicated resource, while another weighted value may indicate a non-reserved or shared resource.

According to an exemplary embodiment, the radio resource management and slice control service may provide an Ultra-Reliable Low-Latency Communication (URLLC) feature service. For example, the URLLC feature service may calculate and assign a set of weighted values that support URLLC. The URLLC feature service may include multiple feature sets that support varying levels of URLLC.

According to an exemplary embodiment, the weighted scheduling service and the weighted resource service may calculate the weighted value based on a network slice identifier and a Fifth Generation (5G) QoS Identifier (5QI). According to an exemplary embodiment, the URLLC feature service may calculate a URLLC feature set based on a network slice identifier and a 5QI.

According to an exemplary embodiment, the radio resource management and slice control service may provide a slice-aware migration service. For example, the slice-aware migration service may migrate an end device from a first frequency band to a second frequency band when a network slice is not supported by the first frequency band but is supported by the second frequency band, as described herein. According to another example, the slice-aware migration service may migrate an end device based on location of the end device and correlated network slice, type of service, and/or other configurable criterion. According to even other examples, the slice-aware migration service may modify other configurations associated with a network connection.

According to an exemplary embodiment, the radio resource management and slice control service may support stand-alone (SA) and non-stand-alone (NSA) architectures. For example, for both SA and NSA architectures, the service may support a single QoS flow per DRB. In this way, the service provides a compatibility between SA and NSA configurations even though, as per 3GPP, SA mode may support multiple QoS flows per DRB. The service may provide backward compatibility during transition from SA to NSA and vice versa as an end device moves in and out of SA and NSA coverage. The backward compatibility may assure acceptable mapping of device SLA in SA mode to NSA mode by assigning the same type of resources, ultra-reliable low-latency communication (URLLC) features. and scheduler priority weight to the end device when the end device moves into NSA mode from SA mode. The radio resource management and slice control service may map a 5QI to a QoS Class Identifier (QCI). For example, in NSA mode, a Fourth Generation (4G) connection with a 4G core network may be included. According to an SA architecture, for example, a 5G RAN may be connected to a 5G core network.

According to an exemplary embodiment, the radio resource management and slice control service may support a transport priority service. For example, in a split architecture, ingress and egress packets of a DU to and from a CU via an F1-U connection may be subject to varying transport priorities, which may be correlated to varying 5QIs, Packet Data Convergence Protocol (PDCP) markings, QoS flows, and/or other values associated with the radio resource management and slice control service, as described herein. The radio resource management and slice control service may support carrier aggregation (CA) (e.g., at the MAC layer) and dual connectivity (DC) (e.g., and the PDCP layer).

In view of the foregoing, the radio resource management and slice control service may provide configurable control of packets and QoS flows associated with network slices and the functionality of a DU device. In this way, SLAs, user experiences, performance metric parameters and values, and/or QoS may be satisfied based on provisioning and configurations provided by the radio resource management and slice control service. The radio resource management and slice control service may provide compatibility with 5G NSA (SCG on NR leg) and SA configuration, as well as other connectivity services, such as DC, CA, and so forth. The radio resource management and slice control service may provide a slice-aware service that may minimize the number of network slices in support of end device demands.

FIG. 1 is a diagram illustrating an exemplary environment 100 in which an exemplary embodiment of the radio resource management and slice control service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may include the radio resource management and slice control service, as described herein.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, MAC layer, RLC layer, and PDCP layer, etc.), plane splitting (e.g., user plane, control plane, etc.), CU and DU, interface splitting (e.g., F1-U, F1-C, E1, Xn-C, Xn-U, X2-C, Common Public Radio Interface (CPRI), etc.) as well as other types of network services, such as DC or higher (e.g., a secondary cell group (SCG) split bearer service, a master cell group (MCG) split bearer, an SCG bearer service, NSA, SA, etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA NR, SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), an RU, a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary embodiments, one or multiple types of access devices 107 may provide the radio resource management and service slice control service, as described herein. For example, as previously described, a (standalone) DU device, an access device 107 that includes an RU and a DU or a DU and a CU, a gNB, an eLTE eNB, or another type of access device 107 that may include the functionality of a DU and/or supports network slicing may provide the radio resource management and service slice control service, as described herein.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC network, an Evolved Packet Core (EPC) of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW–C), a UPF with PGW user plane functionality (e.g., UPF+PGW–U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2:
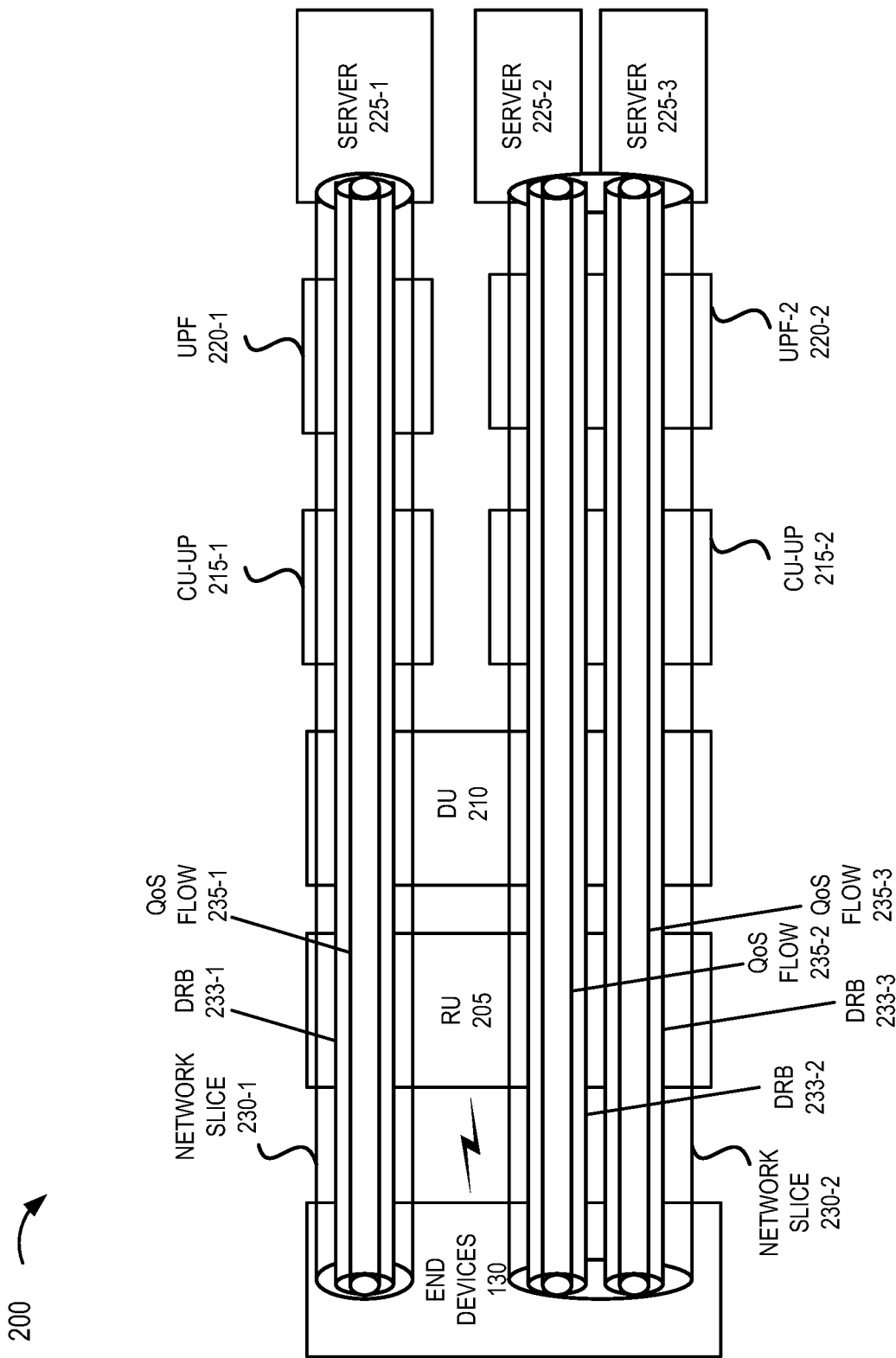
FIG. 2 is a diagram illustrating another exemplary environment in which an exemplary embodiment of the radio resource management and slice control service may be implemented.

FIG. 2 is a diagram illustrating another exemplary environment in which an exemplary embodiment of the radio resource management and slice control service may be implemented. As illustrated, environment 200 includes end devices 130 and various access devices 107, such as RU 205, DU 210, and CU-UP 215-1 and CU-UP 215-2 (also referred to as CU-UPs 215 or individually or generally as CU-UP 215). Core devices 122 include UPF 220-1 and UPF 220-2 (also referred to as UPFs 220 and individually or generally as UPF 220), and external devices 117 include servers 225-1, 225-2, and 225-3 (also referred to as servers 225 and individually or generally as server 225). The number and type of access devices 107, core devices 122, and external devices 117 illustrated in FIG. 2 are exemplary.

As further illustrated, environment 200 includes network slices 230-1 and 230-2 (also referred to as network slices 230 and individually or generally as network slice 230), DRBs 233-1, 233-2, and 233-3 (also referred to as DRBs 233 and individually or generally as DRB 233), and QoS flows 235-1, 235-2, and 235-3 (also referred to as QoS flows 235 and individually or generally as QoS flow 235). According to an exemplary embodiment, the radio resource management and slice control service may provide or support one QoS flow 235 per DRB 233. According to an exemplary embodiment, the radio resource management and slice control service may provide or support one or multiple QoS flows 235 per network slice 230. Servers 225 may provide an application service to end device 130 via network slice 230, DRB 233, and QoS flow 235.

Figure 3A:
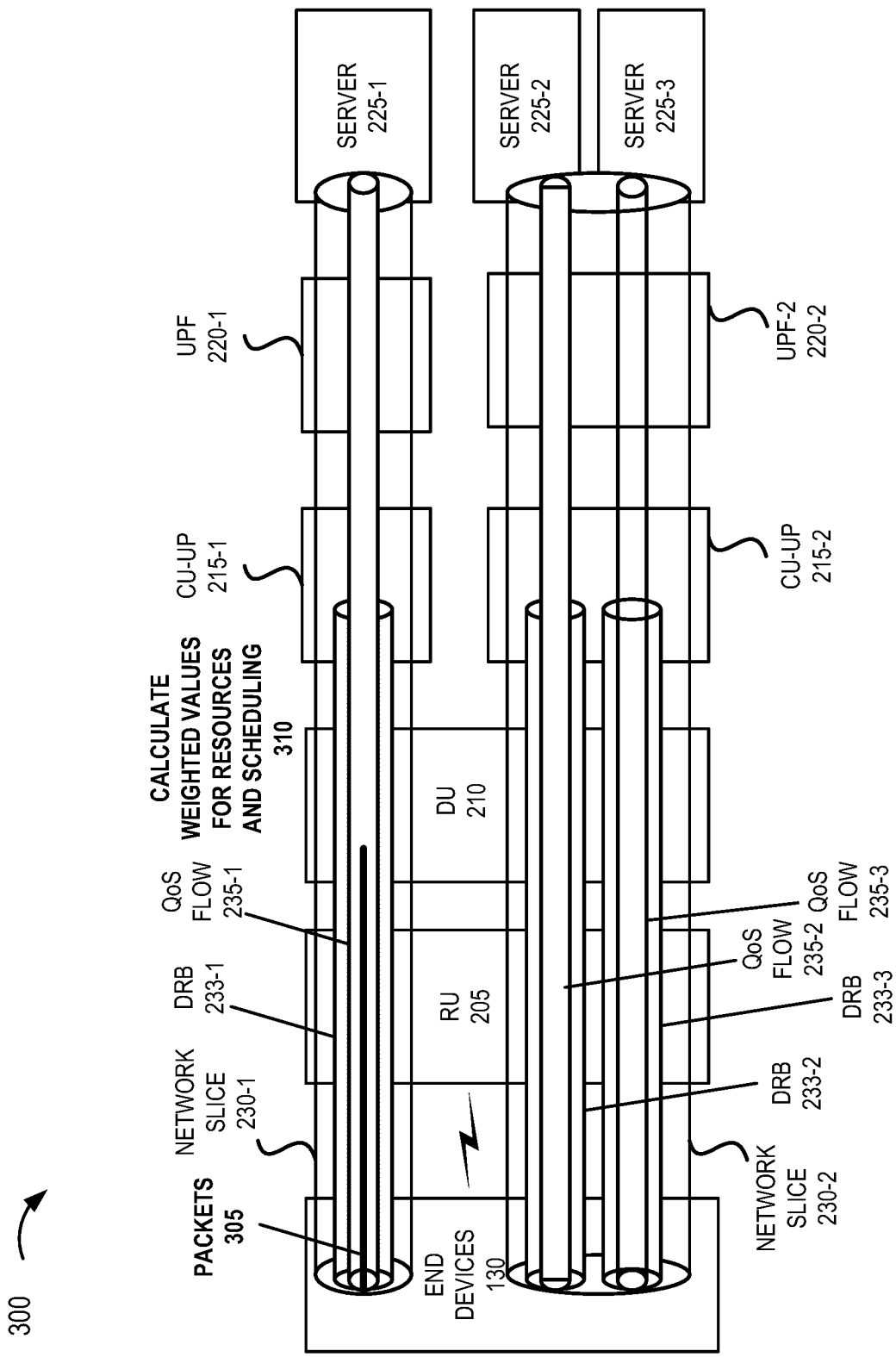
FIGS. 3A-3D are diagrams illustrating exemplary processes of an exemplary embodiment of the radio resource management and slice control service.

FIGS. 3A-3D are diagrams illustrating exemplary processes 300 of an exemplary embodiment of the radio resource management and slice control service may be implemented. Referring to FIG. 3A, assume end device 130 establishes a packet data unit (PDU) session with server 225-1 via network slice 230-1, DRB 233-1, RU 205, DU 210, CU-UP 215-1, and UPF 220-1. Although not illustrated, a CU-CP may communicate with DU 210, for example, and provide various types of information, such as DRB identifier, Single-Network Slice Selection Assistance Information (S-NSSAI), a QoS flow level, a QoS flow level parameter, and/or other types of information that may enable DU 210 to establish network slice 230, DRB 233, and QoS flow 235.

According to this exemplary scenario, as packets 305 of QoS flow 235-1 are transmitted from end device 130 and received by DU 210 in the uplink, DU 210 may calculate weighted values for resources and scheduling 310 for packets 305. According to other exemplary scenarios, packets 305 may originate from server 225-1, for example, received by DU 210 in the downlink. According to either scenario, the weighted values may pertain to a priority of resources and a priority for scheduling for the packets of the QoS flow 235-1. The priority of resources may pertain to air interface resources (e.g., physical resource blocks (PRBs), a new radio (NR) resource block (RB), etc.) and/or network resources of DU 210 (e.g., processor, memory, storage, communication interface, etc.). The priority for scheduling may pertain to transmission of the packets in the uplink (e.g., to CU-UP 215-1) or the downlink (e.g., to RU 205). DU 210 may calculate the weighted values based on a network slice identifier (e.g., of network slice 230-1) and a 5QI (e.g., of QoS flow 235-1). As an example, DU 210 may use the following exemplary expression to calculate each of the weighted values:

$$f(\text{Slice ID}, 5QI) = \text{weighted value} \qquad (1).$$

According to another example, DU 210 may use a different set of arguments to calculate each of the weighted values, such as those in the following exemplary expression:

$$f(\text{Slice ID}, 5QI, DRB\ ID, ARP) = \text{weighted value} \qquad (2),$$

in which a DRB identifier and an Allocation and Retention Priority (ARP) value may be additional arguments to calculate one or both of the weighted values, as described herein. According to various exemplary embodiments, DU 210 may calculate a weighted value for resources and another weighted value for priority of scheduling based on the same or different expressions. Additionally, according to various exemplary embodiments, expressions (1) and (2) may include additional, different, and/or fewer arguments. For example, additional and/or different arguments of relevance relating to priority associated with scheduling and/or resources may be used.

Figure 3B:
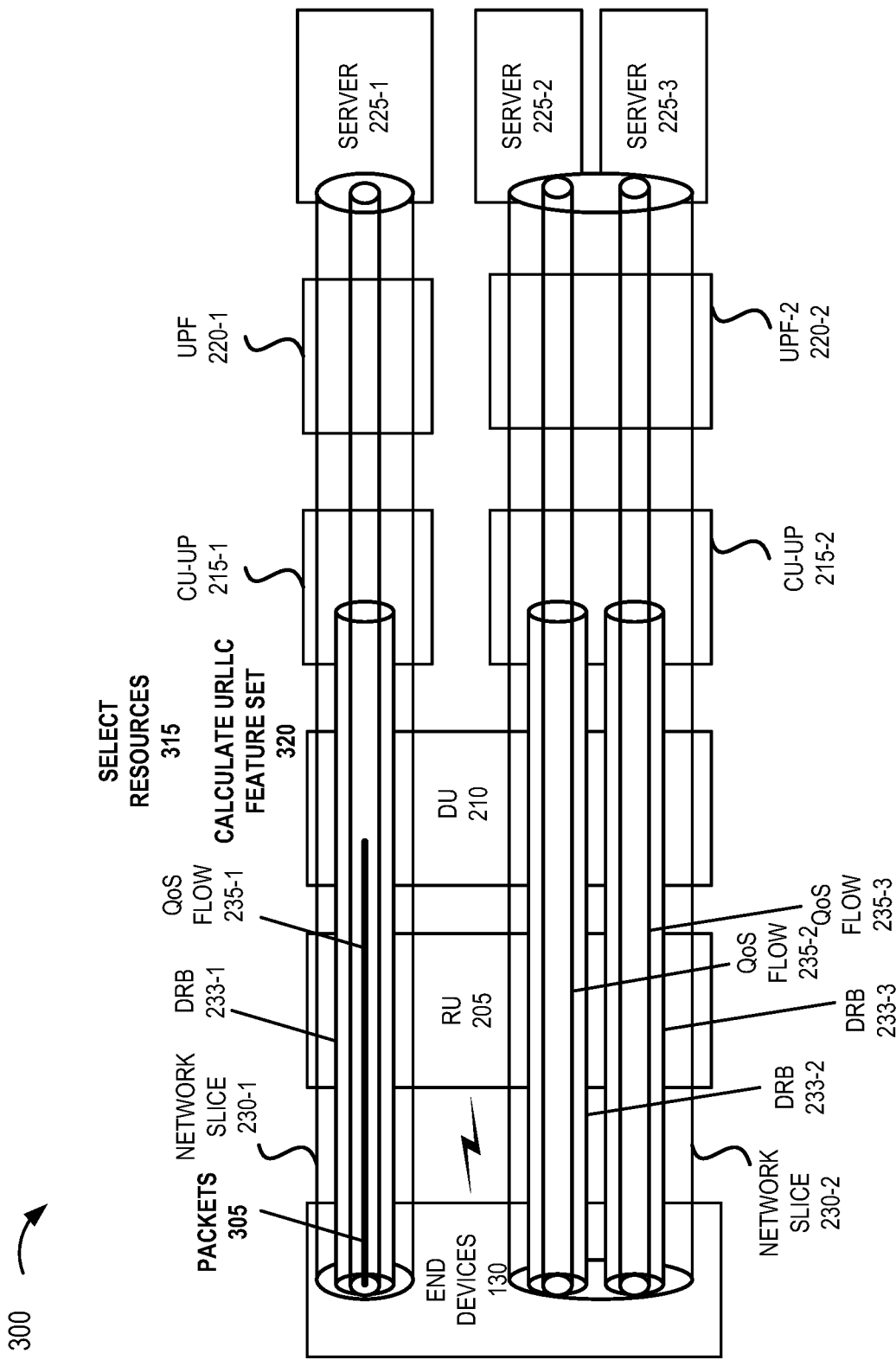

Referring to FIG. 3B, DU 210 may select resources 315 and calculate a URLLC feature set 320 for the packets. For example, resources may be divided into various categories, such as common, priority, and dedicated pools. As an example, common resources may be used by all. Priority resources may be used by only certain slices, but if unused, those resources may be allocated to the common pool. Dedicated resources may be reserved and used only by specific slices. However, the dedicated resources may not be allocated into the common pool or the priority pool if unused. According to other exemplary implementations, the number and/or category of resources may be different. Additionally, or alternatively, the configuration for unused resources of a category may be different. DU 210 may select resources 315 based on the weighted value(s) for resources. According to this example, assume that the packets qualify for URLLC service. According to other examples, the packets may not qualify for URRLC service. As an example, DU 210 may use the following exemplary expression to calculate a URLLC feature set:

$$f(\text{Slice ID}, 5QI) = \text{URLLC feature set} \qquad (3).$$

According to another example, DU 210 may use a different set of arguments to calculate the URLLC feature set, such as those in the following exemplary expression:

$$f(\text{Slice ID}, 5QI, DRB\ ID, ARP) = \text{URLLC feature set} \qquad (4).$$

The URLLC feature set may pertain to reliability and latency performance metric values in relation to transmission and reception of the packets. According to various exemplary embodiments, expressions (3) and (4) may include additional, different, and/or fewer arguments.

According to some exemplary embodiments, DU 210 may store information that correlates weighted values and URLCC feature sets to parameters and values that indicate different priority levels and associated resources, scheduling, URLLC features, and/or other pre-transmission operations, as described herein. DU 210 may perform a lookup and compare a calculated value to the information and provision accordingly. According to other exemplary embodiments, DU 210 may allocate, provision, and/or apply the weighted value or URLCC feature set without such information.

Figure 3C:
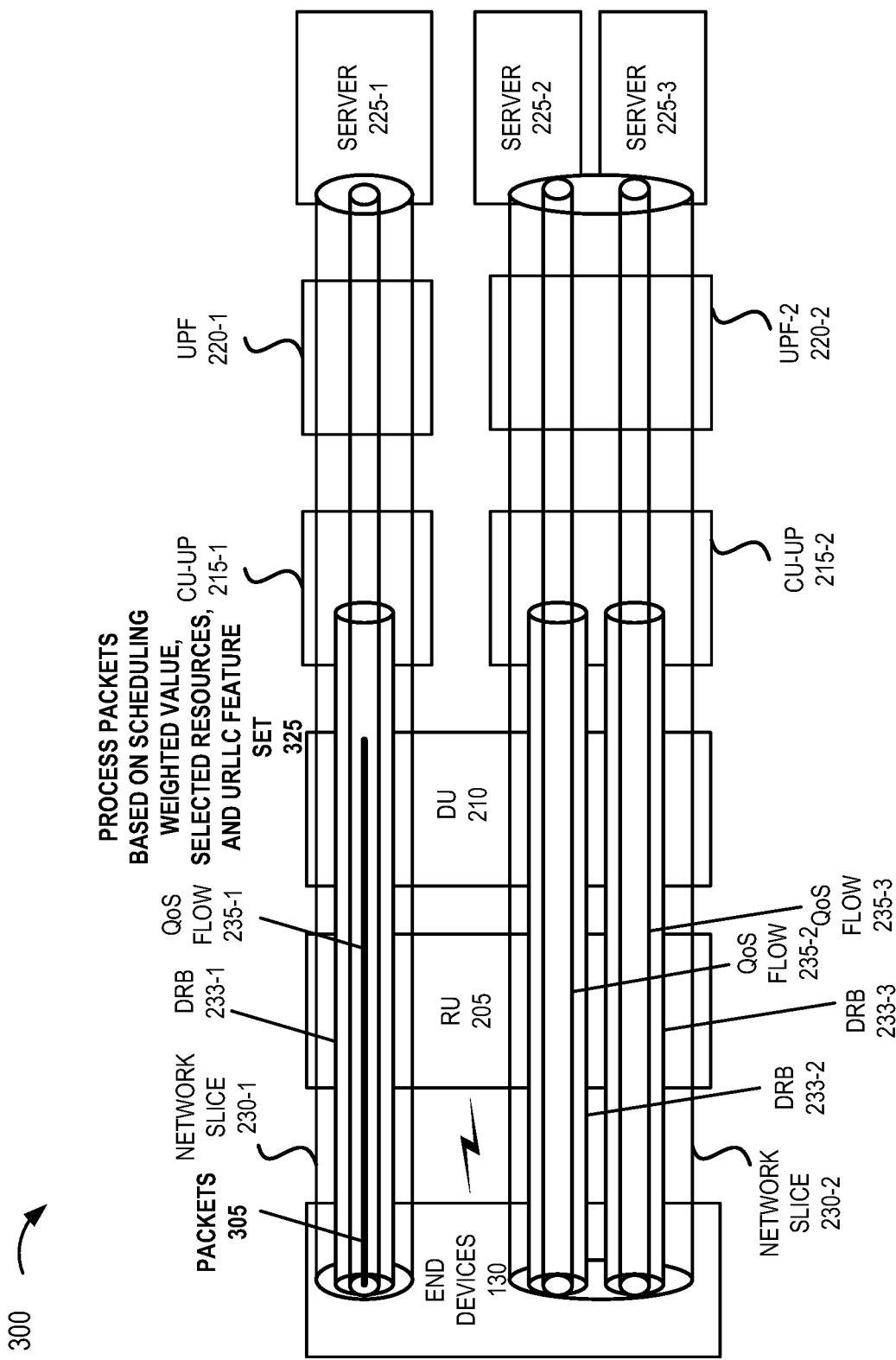

Referring to FIG. 3C, DU 210 may process the packets based on the calculated scheduling weighted value, the selected resources, and URLLC feature set 325. For example, DU 210 may use resources (e.g., network resources, air interface resources, dedicated, etc.), apply a scheduling priority for buffering and transmission of the packets, and apply the URLLC feature set parameters and values to packets 305.

Figure 3D:
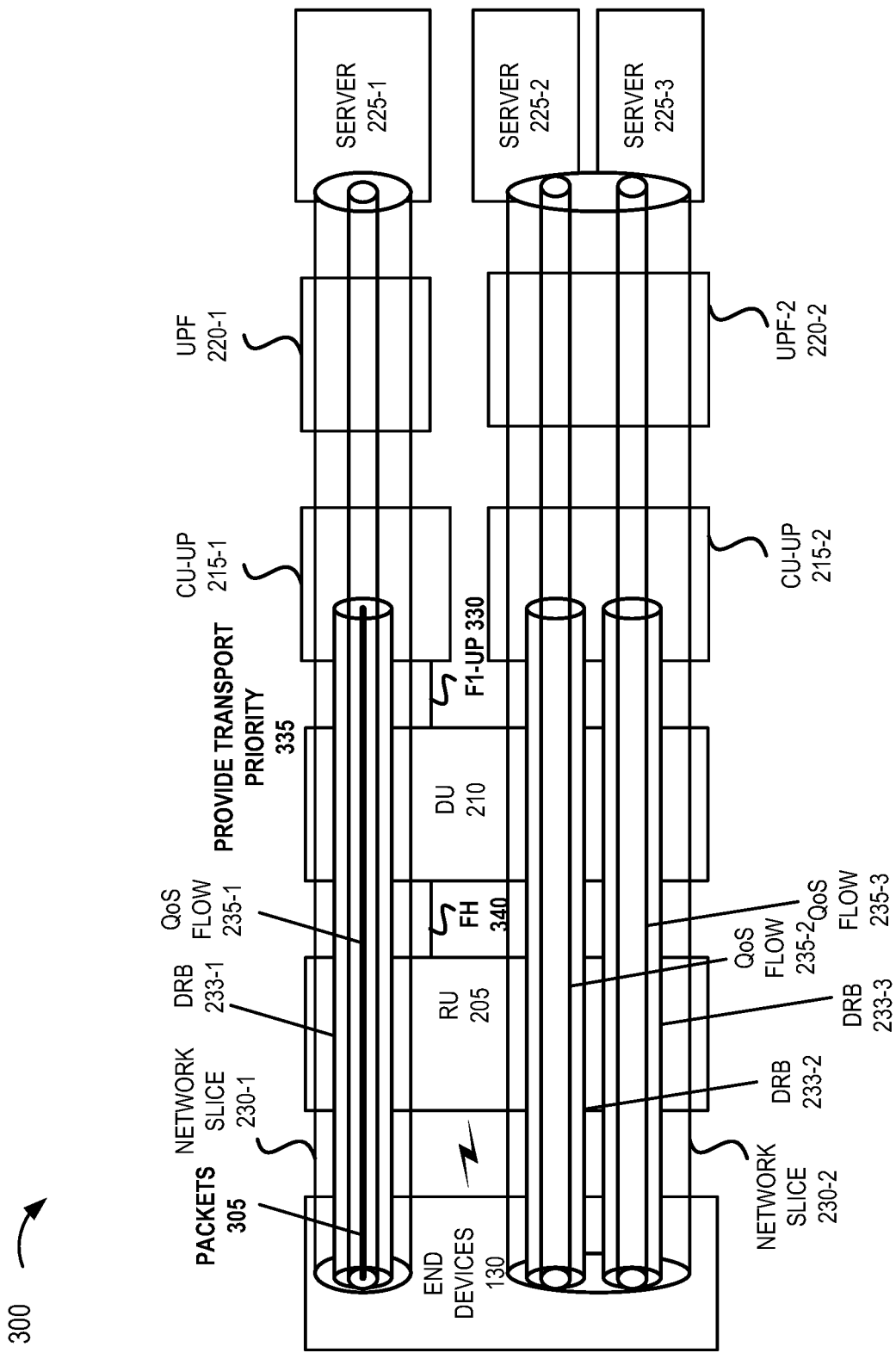

Referring to FIG. 3D, an F1-UP connection 330 may be implemented between DU 210 and CU-UP 215-1. The radio resource management and slice control service may provide a transport priority 335 for packets 305 via F1-UP connection 325 to CU-UP 215-1. For example, DU 210 may mark packets 305 with a Differentiated Service Code Point (DSCP) value based on 5QI or 5QI and ARP priority levels. In this way, different DRBs may provide flexibility and/or tunability at RLC and PDCP layers. For example, there may be varying PDCP packet discard timers and/or unacknowledged mode (UM) for voice packets. The transport priority service may also relate to Class of Service (CoS) or P-bit value associated with a service virtual local area network (VLAN) Ethernet. According to other exemplary scenarios, the transport priority service may provide a transport priority for packets via a front-haul connection 340 between DU 210 and RU 205.

FIGS. 3A-3D illustrate an exemplary embodiment of a process of the radio resource management and slice control service, according to other exemplary scenarios, the radio resource management and slice control service may perform additional operations, fewer operations, and/or different operations than those illustrated and described.

Figure 4A:
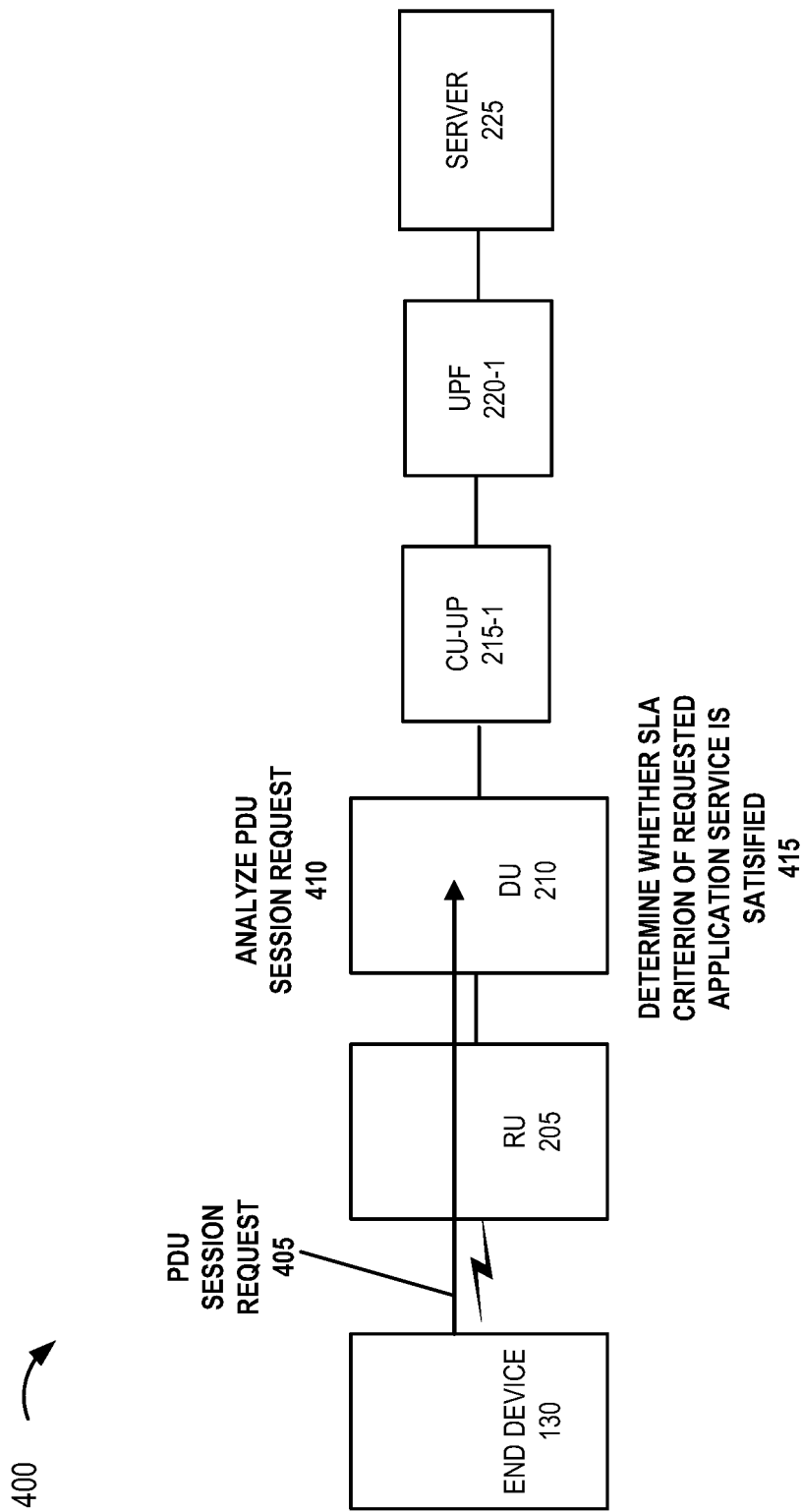
FIGS. 4A-4C are diagrams illustrating another exemplary process of an exemplary embodiment of the radio resource management and slice control service.
Figure 4B:
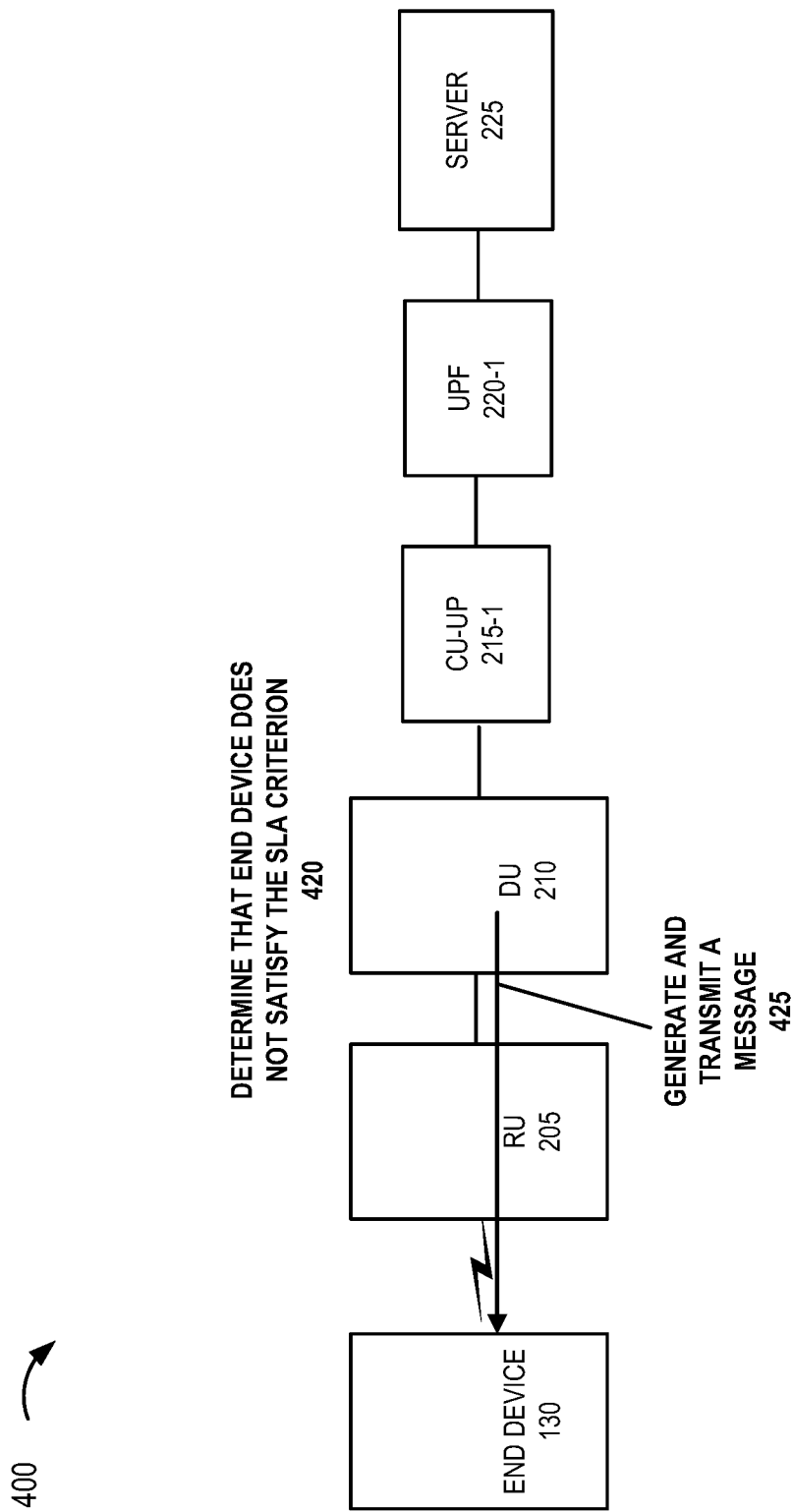
Figure 4C:
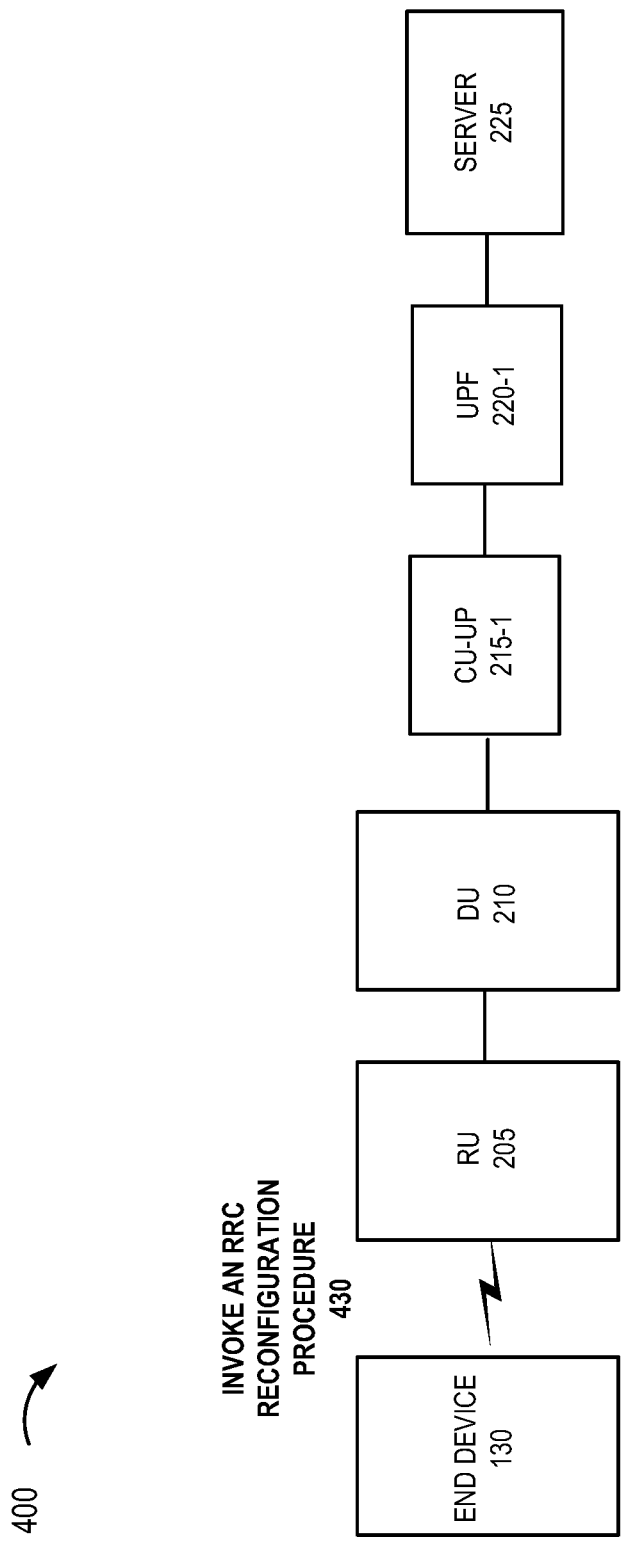

FIGS. 4A-4C are diagrams illustrating another exemplary process of an exemplary embodiment of the radio resource management and slice control service. Assume end device 130 is attached and registered to access network 105 (e.g., RU 205, DU 210, and CU-UP 215-1) and core network 120 (e.g., including UPF 220-1). Thereafter, according to an exemplary scenario a user (not illustrated) of end device 130 may execute an application. End device 130 may generate and transmit a PDU session request 405, which is received by DU 210. For example, PDU session request 405 may be a request to establish an application service session with application service server (e.g., external device 117). In response, DU 210 may analyze the PDU session request 410 and may determine whether SLA criterion of a requested application service is satisfied 415. For example, the SLA criterion may relate to the frequency band associated with an RRC connection between RU 205 and end device 130. Additionally, or alternatively, the SLA criterion may relate to the location of end device 130.

According to an exemplary scenario, assume the requested application service is an URLLC service. According to an exemplary embodiment, DU 210 may store information that correlates an SLA criterion or criteria to application services. The information may also correlate network slice identifiers that identify network slices that support the application services. Referring to FIG. 4B, DU 210 may determine that end device 130 does not satisfy one or multiple SLA criterion 420. For example, DU 210 may determine that end device 130 should migrate to a different frequency band and/or duplexing scheme (e.g., mmWave versus Sub-3 FDD, mmWave versus Sub-6 TDD, etc.), attach to a different RU 205, attach to a different CU-UP 215 (e.g., a CU-UP 215 configured for local break out (LBO), private (versus public) communication, time-sensitive networking (TSN) communication, etc.), and/or some other modified network connection configuration (e.g., UE location specific, etc.). According to some exemplary embodiments, DU 210 may store end device capability information of end device 130. DU 210 may use the end device capability information to identify a modification to the current connection configuration that would support the requested application service. For example, DU 210 may determine a frequency band, a RAT, or other feature supported by end device 130 that correlates to a network slice and/or associated network connection configuration that supports the requested application service.

As illustrated, according to this exemplary scenario, assume that DU 210 generates and transmits a message 425 to RU 205 and/or end device 130. Message 425 may include information indicating the modification of the current connection. According to some exemplary implementations, message 425 may be implemented as a PDU session response that also includes network connection configuration information. According to other exemplary implementations, message 425 may only include the network connection configuration information. Referring to FIG. 4C, in response to receiving message 425, end device 130 or RU 205 may invoke an RRC reconfiguration procedure 430. For example, according to an exemplary scenario, end device 130 may migrate to a different frequency band, a different RAT, a different RU, and/or so forth that supports a network slice and requested application service. According to some exemplary implementations, end device 130 may have to transmit another PDU session request after modification of the network connection. According to other exemplary scenarios, other types of procedures may be invoked by RU 205, DU 210, CU 215, and/or other network devices of access network 105 and/or core network 120 that may modify the network connection with end device 130.

FIGS. 4A-4C illustrate another exemplary process 400 of the radio resource management and slice control service, according to other exemplary scenarios, the radio resource management and slice control service may perform additional operations, fewer operations, and/or different operations than those illustrated and described.

FIG. 5 is a diagram illustrating exemplary components of a device 500 that may be included in one or more of the devices described herein. For example, device 500 may correspond to access device 107, external device 117, core device 122, end device 130, RU 205, DU 210, CU 215, UPF 220, server 225 and/or other types of network devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to DU 210, software 520 may include an application that, when executed by processor 510, provides a function and/or a process of the radio resource management and slice control service, as described herein. According to another example, software 520 may include an application that, when executed by processor 510, provides a function and/or a process of the radio resource management and slice control service, as described herein, relative to another type of access device 107, which may include DU functionality. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, or a reference interface, for example.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
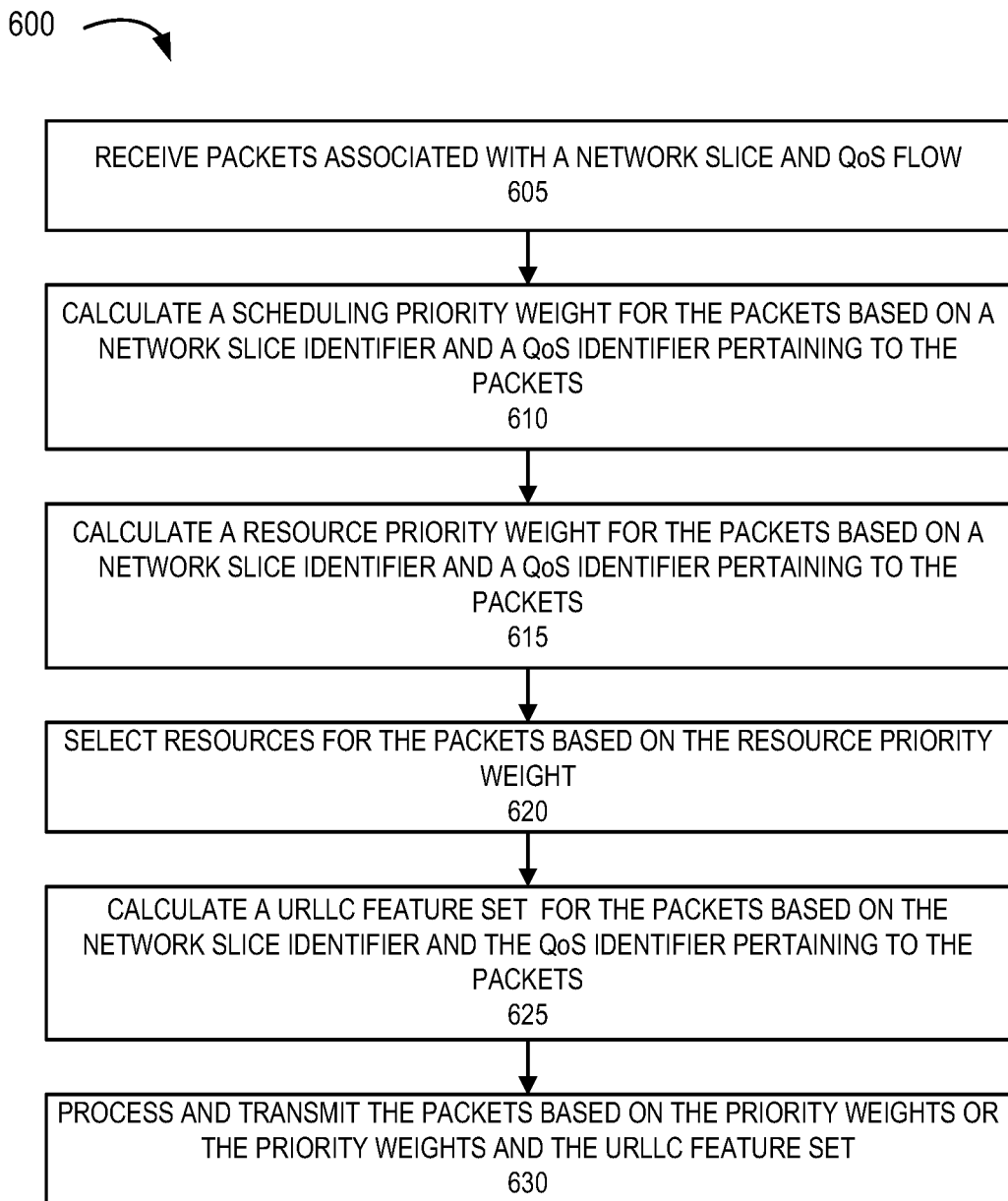
FIG. 6 is a flow diagram illustrating an exemplary process of an exemplary embodiment of the radio resource management and slice control service.

FIG. 6 is a flow diagram illustrating an exemplary process 600 of an exemplary embodiment of the radio resource management and slice control service. According to an exemplary embodiment, DU 210 or another type of access device 107 that includes DU functionality may perform a step of process 600. According to an exemplary implementation, processor 510 executes software 520 to perform the step of process 600, as described herein. Alternatively, the step may be performed by execution of only hardware.

In block 605, access device 107 may receive packets associated with a network slice and a QoS flow. For example, access device 107 may receive packets of a PDU session in the uplink or the downlink.

In block 610, access device 107 may calculate a scheduling priority weight for the packets based on a network slice identifier and a QoS identifier pertaining to the packets. For example, access device 107 may calculate a priority weight pertaining scheduling of the packets for transmission. As previously described, access device 107 may calculate the scheduling priority weight based on equation (1) or equation (2), for example.

In block 615, access device 107 may calculate a resource priority weight for the packets based on a network slice identifier and a QoS identifier pertaining to the packets. For example, access device 107 may calculate a priority weight pertaining resources (e.g., network resources of access device 107, air interface resources, and/or other communication link resources). As previously described, access device 107 may calculate the resource priority weight based on equation (1) or equation (2), for example.

In block 620, access device 107 may select or assign resources for the packets based on the resource priority weight. For example, access device 107 may select a category of resources (e.g., common, dedicated, reserved, or another type of resources) to use to support the packets. As previously described, the resources may relate to air interface resources and/or network resources (e.g., physical, logical, virtual). According to another exemplary embodiment, access device 107 may select or assign resources based on additional information (e.g., scheduling priority weight, URLCC feature set, etc.).

In block 625, access device 107 may calculate a URLLC feature set for the packets based on the network slice identifier and the QoS identifier pertaining to the packets. For example, access device 107 may calculate URLLC parameters and values for the packets based on equation (3) or equation (4), for example.

In block 630, access device 107 may process and transmit the packets based on the priority weights or the priority weights and the URLCC feature set. For example, access device 107 may process the packets (e.g., route selection, buffering, scheduling of transmission, and/or other pre-transmission operation(s)) and transmit the packets based on the scheduling and resources correlated to the priority weights. According to such an example, the URLLC feature set may be inapplicable to the packets. According to another example, in which the URLLC feature set is application (e.g., packets relate to a URLCC service), access device 107 may process and transmit the packets based on the priority weights and the URLLC feature set, as described herein.

Although FIG. 6 illustrates an exemplary embodiment of a process of the radio resource management and slice control service, according to other exemplary scenarios, the radio resource management and slice control service may perform additional operations, fewer operations, and/or different operations than those illustrated and described. For example, access device 107 may mark the packets with a DSCP value based on 5QI or 5QI and ARP priority levels. In this way, different DRBs may provide flexibility and/or tunability at RLC and PDCP layers as a part of the transport priority service, as described herein. The transport priority service may provide a transport priority for the packets in the uplink or the downlink when access device 107 transmits the marked packets to another device (e.g., RU, CU, etc.).

Figure 7:
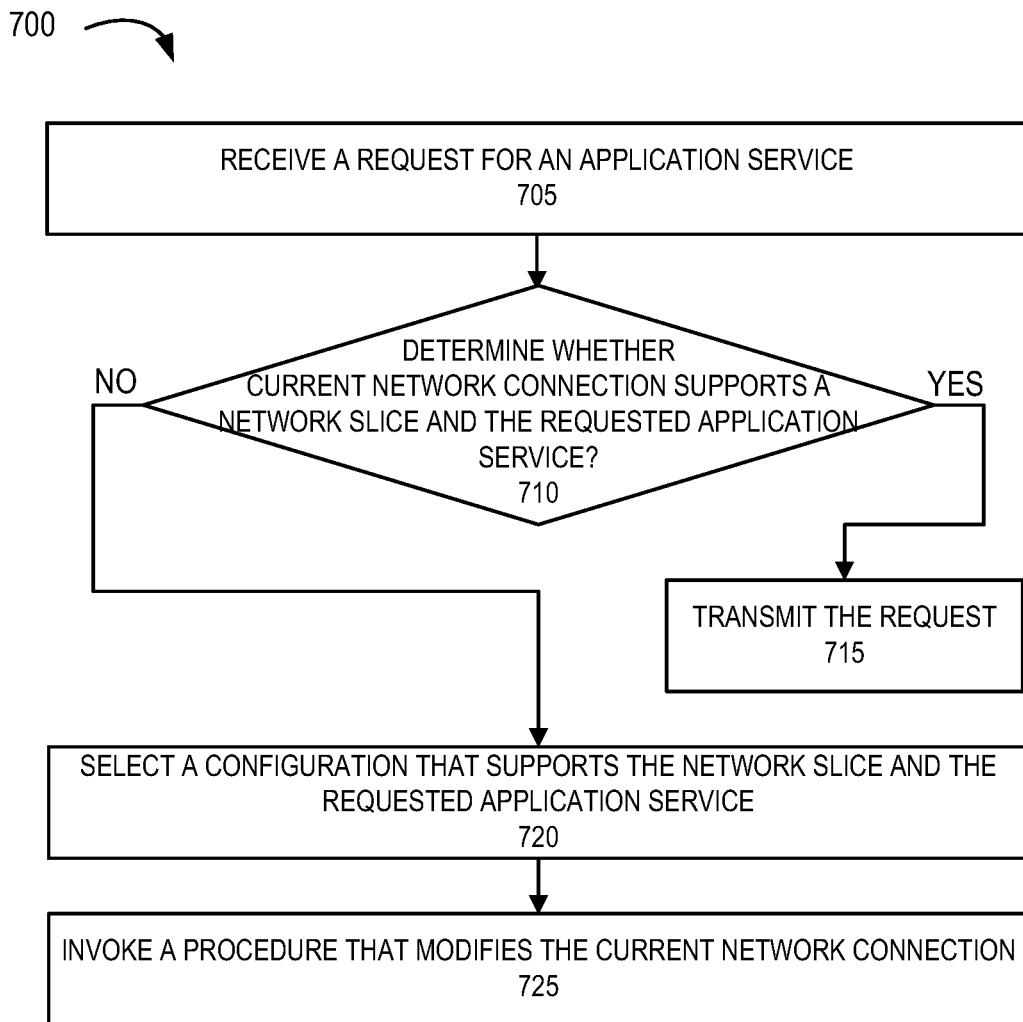
FIG. 7 is a flow diagram illustrating another exemplary process of an exemplary embodiment of the radio resource management and slice control service.

FIG. 7 is a flow diagram illustrating another exemplary process 700 of an exemplary embodiment of the radio resource management and slice control service. According to an exemplary embodiment, DU 210 or another type of access device 107 that includes DU functionality may perform a step of process 600. According to an exemplary implementation, processor 510 executes software 520 to perform the step of process 700, as described herein. Alternatively, the step may be performed by execution of only hardware.

In block 705, access device 107 may receive a request for an application service. For example, access device 107 may receive the request from end device 130.

In block 710, access device 107 may determine whether a current network connection supports a network slice and the requested application service. For example, access device 107 may analyze the request and identify criterion/criteria of a network connection that supports the requested application service. The criterion/criteria may relate to a radio connection with end device 130, another leg of a network connection in access network 105 or between access network 105 and core network 120. Access device 107 may compare the current network connection configuration to a network connection configuration that supports the network slice and associated SLA and/or QoS requirements that supports the requested application service. According to an exemplary embodiment, access device 107 may store information that correlates network connection configurations with network slices and application services. Access device 107 may use this information to make the determination. Additionally, access device 107 may store end device capability information pertaining to end device 130.

When access device 107 determines that the current network connection supports the network slice and the requested application service (block 710—YES), access device 107 may transmit the request to an uplink network device (block 715). Process 700 may end.

When access device 107 determines that the current network connection does not support the network slice and the requested application service (block 710—NO), access device 107 may select network configuration information of a network connection that supports the network slice and the requested application service (block 720).

In block 725, access device 107 may invoke a procedure that modifies the current network connection with end device 130. For example, access device 107 may generate and transmit a message to another access device 107 and/or end device 130 to modify the current network connection to the selected network connection. The message may include network configuration information pertaining to a frequency band, a RAT, and/or another configuration of the selected network connection that may be different from the current network connection, as described herein.

Although FIG. 7 illustrates an exemplary embodiment of a process of the radio resource management and slice control service, according to other exemplary scenarios, the radio resource management and slice control service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device of a radio access network, packets associated with a network slice, a quality of service (QoS) flow, and an application service;
   calculating, by the network device, a first priority weight and a second priority weight for the packets based on a network slice identifier and a QoS identifier of the QoS flow;
   processing, by the network device, the packets based on the first priority weight and the second priority weight, wherein the processing includes one or more pre-transmission operations pertaining to the packets; and
   transmitting, by the network device to another device, the packets based on the first priority weight and the second priority weight.

2. The method of claim 1, wherein the first priority weight indicates a priority value pertaining to at least one of a network resource of the network device or an air interface resource, and wherein the second priority weight indicates a priority value pertaining to scheduling a transmission of the packets.

3. The method of claim 1, further comprising:
   calculating, by the network device, an ultra-reliable low-latency communication (URLLC) feature set for the packets based on the network slice identifier and the QoS identifier of the QoS flow; and wherein the transmitting further comprises:
   transmitting, by the network device to another device, the packets based on the first priority weight, the second priority weight, and the URLLC feature set.

4. The method of claim 1, further comprising:
   receiving, by the network device before receiving the packets, a request to establish an application service session of the application service;
   determining, by the network device, that a current network connection between the radio access network and an end device does not support the network slice and the QoS flow;
   selecting, by the network device, a configuration for a network connection between the radio access network and the end device that does support the network slice and the QoS flow; and
   invoking, by the network device, a procedure that modifies the current network connection to the configuration for the network connection.

5. The method of claim 4, wherein the procedure includes informing the end device to switch to a different frequency band to connect to the radio access network.

6. The method of claim 1, wherein the QoS identifier includes a Fifth Generation QoS Identifier (5QI) or a QoS Class Identifier (QCI).

7. The method of claim 1, further comprising:
   marking, by the network device, the packets with a differentiated service code point value that indicates a transport priority based on the QoS identifier, and wherein the transmitting further comprises:
   transmitting, by the network device to the other device, the marked packets based on the first priority weight and the second priority weight.

8. The method of claim 1, wherein the network device includes a distributed unit (DU) device.

9. A network device comprising:
   a processor configured to:
   receive packets associated with a network slice, a quality of service (QoS) flow, and an application service, wherein the network device is of a radio access network;
   calculate a first priority weight and a second priority weight for the packets based on a network slice identifier and a QoS identifier of the QoS flow;
   process the packets based on the first priority weight and the second priority weight, wherein the processing includes one or more pre-transmission operations pertaining to the packets; and
   transmit to another device, the packets based on the first priority weight and the second priority weight.

10. The network device of claim 9, wherein the first priority weight indicates a priority value pertaining to at least one of a network resource of the network device or an air interface resource, and wherein the second priority weight indicates a priority value pertaining to scheduling a transmission of the packets.

11. The network device of claim 9, wherein the processor is further configured to:
    calculate an ultra-reliable low-latency communication (URLLC) feature set for the packets based on the network slice identifier and the QoS identifier of the QoS flow; and wherein the processor is further configured to:
    transmit to another device, the packets based on the first priority weight, the second priority weight, and the URLLC feature set.

12. The network device of claim 9, wherein the processor is further configured to:
    receive before receiving the packets, a request to establish an application service session of the application service;
    determine that a current network connection between the radio access network and an end device does not support the network slice and the QoS flow;
    select a configuration for a network connection between the radio access network and the end device that does support the network slice and the QoS flow; and invoke a procedure that modifies the current network connection to the configuration for the network connection.

13. The network device of claim 12, wherein the procedure includes informing the end device to switch to a different frequency band to connect to the radio access network.

14. The network device of claim 9, wherein the QoS identifier includes a Fifth Generation QoS Identifier (5QI) or a QoS Class Identifier (QCI).

15. The network device of claim 9, wherein the processor is further configured to:
   mark the packets with a differentiated service code point value that indicates a transport priority based on the QoS identifier, and
   transmit to the other device, the marked packets based on the first priority weight and the second priority weight.

16. The network device of claim 9, wherein the network device includes a distributed unit (DU) device.

17. A non-transitory computer-readable storage medium storing instructions executable by a processor of a network device of a radio access network, which when executed cause the network device to:
   receive packets associated with a network slice, a quality of service (QoS) flow, and an application service;
   calculate a first priority weight and a second priority weight for the packets based on a network slice identifier and a QoS identifier of the QoS flow;
   process the packets based on the first priority weight and the second priority weight, wherein the processing includes one or more pre-transmission operations pertaining to the packets; and
   transmit to another device, the packets based on the first priority weight and the second priority weight.

18. The non-transitory computer-readable storage medium of claim 17, wherein the first priority weight indicates a priority value pertaining to at least one of a network resource of the network device or an air interface resource, and wherein the second priority weight indicates a priority value pertaining to scheduling a transmission of the packets.

19. The non-transitory computer-readable storage medium of claim 17, wherein the instructions comprise further instructions, which when executed, cause the network device to:
   receive before receiving the packets, a request to establish an application service session of the application service;
   determine that a current network connection between the radio access network and an end device does not support the network slice and the QoS flow;
   select a configuration for a network connection between the radio access network and the end device that does support the network slice and the QoS flow; and
   invoke a procedure that modifies the current network connection to the configuration for the network connection.

20. The non-transitory computer-readable storage medium of claim 17, wherein the network device includes a distributed unit (DU) device, and wherein the QoS identifier includes a Fifth Generation QoS Identifier (5QI) or a QoS Class Identifier (QCI).

\* \* \* \* \*